(12) United States Patent
Shiebler (10) Patent No.: US 10,803,386 B2
(45) Date of Patent: Oct. 13, 2020

(54) MATCHING CROSS DOMAIN USER AFFINITY WITH CO-EMBEDDINGS

(71) Applicant: Twitter, Inc., San Francisco, CA (US)

(72) Inventor: Daniel Shiebler, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 16/271,618

(22) Filed: Feb. 8, 2019

(65) Prior Publication Data
US 2019/0251435 A1 Aug. 15, 2019

Related U.S. Application Data

(60) Provisional application No. 62/628,798, filed on Feb. 9, 2018.

(51) Int. Cl.
*G06F 3/14* (2006.01)
*G06N 3/08* (2006.01)
*G06F 17/16* (2006.01)
*G06N 3/04* (2006.01)

(52) U.S. Cl.
CPC .............. *G06N 3/08* (2013.01); *G06F 17/16* (2013.01); *G06N 3/04* (2013.01)

(58) Field of Classification Search
CPC ........................................................ G06F 3/14
USPC .............................. 715/745; 706/46; 382/128
See application file for complete search history.

(56) References Cited

U.S. PATENT DOCUMENTS

| | | | |
|---|---|---|---|
| 10,013,699 B1* | 7/2018 | Pope | G06Q 30/0214 |
| 2008/0118124 A1* | 5/2008 | Madabhushi | G06K 9/469 |
| | | | 382/128 |
| 2015/0170035 A1* | 6/2015 | Singh | G06N 5/022 |
| | | | 706/46 |
| 2019/0130285 A1* | 5/2019 | Snyder | G06Q 30/0613 |

* cited by examiner

*Primary Examiner* — Ruay Ho
(74) *Attorney, Agent, or Firm* — Wolf, Greenfield & Sacks, P.C.

(57) ABSTRACT

Systems and methods for determining items in a target domain to recommend to a user whom has not previously interacted with items in the target domain is described. The method comprises generating an auxiliary domain user embedding based on user affinities for each of a plurality of items in an auxiliary domain and embeddings for each of the plurality of items in the auxiliary domain, providing the auxiliary domain user embedding as input to a neural network configured to output a target domain user embedding, predicting target domain user affinities for items in the target domain based, at least in part, on a similarity measure between the target domain user embedding and an embedding for at least one item in the target domain, and determining a set of items in the target domain to recommend to the user based, at least in part, on the predicted target domain user affinities.

15 Claims, 8 Drawing Sheets

NUMBER OF WEB DOMAIN INTERACTIONS

FIG. 5B

NUMBER OF PRODUCER INTERACTIONS

MATCHING CROSS DOMAIN USER AFFINITY WITH CO-EMBEDDINGS

RELATED APPLICATIONS

This Application claims priority under 35 U.S.C. § 119(e) to U.S. application Ser. No. 62/628,798, filed Feb. 9, 2018, entitled "MATCHING CROSS DOMAIN USER AFFINITY WITH CO-EMBEDDINGS," the entirety of which is incorporated herein by reference.

BACKGROUND

In today's world of limitless entertainment, the competition for attention is fiercer than ever. When a user opens a web site or an app, they expect to see something they like immediately. In response to this competition, companies have developed powerful collaborative filtering algorithms that exploit users' explicit and implicit feedback to predict which new items they will like based on the structure in a user-item affinity graph.

Some conventional approaches include neighborhood approaches which predict user affinity by explicitly grouping users and items and model based approaches such as matrix factorization. Recently, researchers have shown success with techniques that exploit nonlinear user-item relationships like autoencoders, Restricted Boltzmann Machines (RBMs) and supervised deep neural networks. While many of these techniques frame recommendation as a "reconstruction" problem, where the objective is to "fill in the gaps" in incomplete user-item affinity information, some cast it as a simple regression task.

SUMMARY

As online services have increased their range of offerings, users' patience for services that fail to immediately understand their preferences has decreased. To combat this, companies have begun to take advantage of more and varied data sources, and researchers have increased their focus on algorithms that exploit multi-source data. Transfer learning techniques like sharing parameter weights, model components or embeddings can reduce cross domain modeling redundancy and improve performance. To that end, some embodiments are directed to a novel machine learning technique and loss function for recommending target domain items to users based on their historical interactions with auxiliary domain items. By using an embedding approach some embodiments require reduced computational cost to match users with items and generate reusable user representations for downstream machine learning tasks.

Some embodiments are directed to a computer-implemented system for determining a set of items in a target domain to recommend to a user without the user having previously interacted with items in the target domain, the system comprising: at least one computer processor; and a non-transitory computer readable medium encoded with a plurality of instructions that, when executed by the at least one computer processor perform a method, the method comprising: generating an auxiliary domain user embedding based on user affinities for each of a plurality of items in an auxiliary domain and an auxiliary domain embedding map that includes embeddings for each of the plurality of items in the auxiliary domain; providing the auxiliary domain user embedding as input to a neural network configured to output a target domain user embedding; predicting target domain user affinities for items in the target domain based, at least in part, on a similarity measure between the target domain user embedding and an embedding for at least one item in the target domain included in a target domain embedding map; and determining a set of items in the target domain to recommend to the user based, at least in part, on the predicted target domain user affinities.

Some embodiments are directed to a computer-implemented method for determining a set of items in a target domain to recommend to a user without the user having previously interacted with items in the target domain, the method comprising: generating an auxiliary domain user embedding based on user affinities for each of a plurality of items in an auxiliary domain and an auxiliary domain embedding map that includes embeddings for each of the plurality of items in the auxiliary domain; providing the auxiliary domain user embedding as input to a neural network configured to output a target domain user embedding; predicting target domain user affinities for items in the target domain based, at least in part, on a similarity measure between the target domain user embedding and an embedding for at least one item in the target domain included in a target domain embedding map; and determining a set of items in the target domain to recommend to the user based, at least in part, on the predicted target domain user affinities.

Some embodiments are directed to a non-transitory computer-readable medium encoded with a plurality of instructions that, when executed by at least one computer processor, perform a method, the method comprising: generating an auxiliary domain user embedding based on user affinities for each of a plurality of items in an auxiliary domain and an auxiliary domain embedding map that includes embeddings for each of the plurality of items in the auxiliary domain; providing the auxiliary domain user embedding as input to a neural network configured to output a target domain user embedding; predicting target domain user affinities for items in the target domain based, at least in part, on a similarity measure between the target domain user embedding and an embedding for at least one item in the target domain included in a target domain embedding map; and determining a set of items in the target domain to recommend to the user based, at least in part, on the predicted target domain user affinities.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

DETAILED DESCRIPTION

One of the allures of matrix factorization and certain deep collaborative filtering methods is that they yield low dimensional user and item embeddings. In large multi-component systems these embeddings can be used as information dense inputs to other machine learning models. The user and item embeddings generated by matrix factorization have another desirable property: they are co-embeddings which lie in the same vector space. Therefore, user-item affinity can be estimated with just a dot product of two embedding vectors, rather than an computationally expensive neural network evaluation. Furthermore, approximate nearest neighbors systems may be used to efficiently match items to users.

For most collaborative filtering algorithms, it is difficult to generate embeddings or make meaningful recommendations for new users. The inventors have recognized and appreciated that one approach to this "user cold start" problem is to utilize users' actions in an auxiliary domain in order to inform recommendations in the target domain. To this end, some embodiments are directed to a novel scalable technique that uses auxiliary domain implicit feedback data to both recommend target domain items to new users and to generate generically useful user representations.

Some conventional cross domain models rely on transfer learning at the latent factor or cluster level to join domains. Some employ user-provided cross domain tags like genre to add model structure like additional matrix dimensions or factorization objective constraints. Others focus on discovering and exploiting structure underlying user-item affinity matrices in multiple domains.

The inventors have recognized that these approaches tend to perform poorly in the true cold start situation, where the user has performed no actions with items in the target domain. One strategy to handle the cold-start problem is to concatenate the user-item interaction profiles in each domain into a joint domain interaction profile and then perform conventional collaborative filtering techniques. Another strategy is to develop a mapping from user-item interactions in the source domain to interactions in the target domain. For example, Canonical Correlation Analysis may be used to compute the correlation matrix P and the canonical component matrices $W_x$ and $W_y$, and these matrices may be used to project the source domain user-item interaction matrix X to an estimate of the target domain user-item interaction matrix Y with $\hat{Y}=XW_x PW_y^T$. Recent work has shown that this approach may be scalable to larger datasets by incorporating dimensionality reduction techniques.

Recently, neural methods for learning the mapping from source domain to target domain have grown in popularity. For example, it has been shown that co-embeddings for entities may be determined based on positive entity pairs and can be used to generate user-item recommendations from binary feedback data. Others have used a multi-view deep neural network model with feature hashing that embeds users and items from multiple domains in the same space.

Some neighborhood-based recommendation systems predict a user's affinity for a new item by finding other users who have highly correlated item affinity vectors. In addition, correlation has been previously used as a loss function in methods where the exact magnitude of a continuous output is unimportant, such as Cascade Correlation networks.

Some embodiments are directed to a solution to the problem of recommending to a user a set of items that belong to some target domain under the constraint that the user has not interacted with any items in the target domain but has interacted with items that belong to some auxiliary domain. The objective is to recommend to the user the items in the target domain that they will most enjoy. In order to quantify this, the strength of a user's interaction with an item is used as a measure of that user's "affinity" for that item. For example, the number of times that a user visits a news website is used as a measure of that user's affinity for that news website. Similarly, the number of posts that a user likes on a social media account is a measure of that user's affinity for that account. Note that this is a form of graded implicit feedback data, and that the absence of interaction between a user and an item is taken to be indicative of low affinity between that user and that item. Since some embodiments only use auxiliary domain data to predict target domain affinity, the model's performance is not decreased by out-of-bag user-item pairs.

Some embodiments are directed to an end-to-end framework for generating co-embeddings of users and target domain items. In this framework, a user's target domain embedding is a function of their auxiliary domain item affinities, and the predicted affinity between a user and a target domain item is determined by the similarity between their target domain embedding and that item's embedding.

Figure 1:
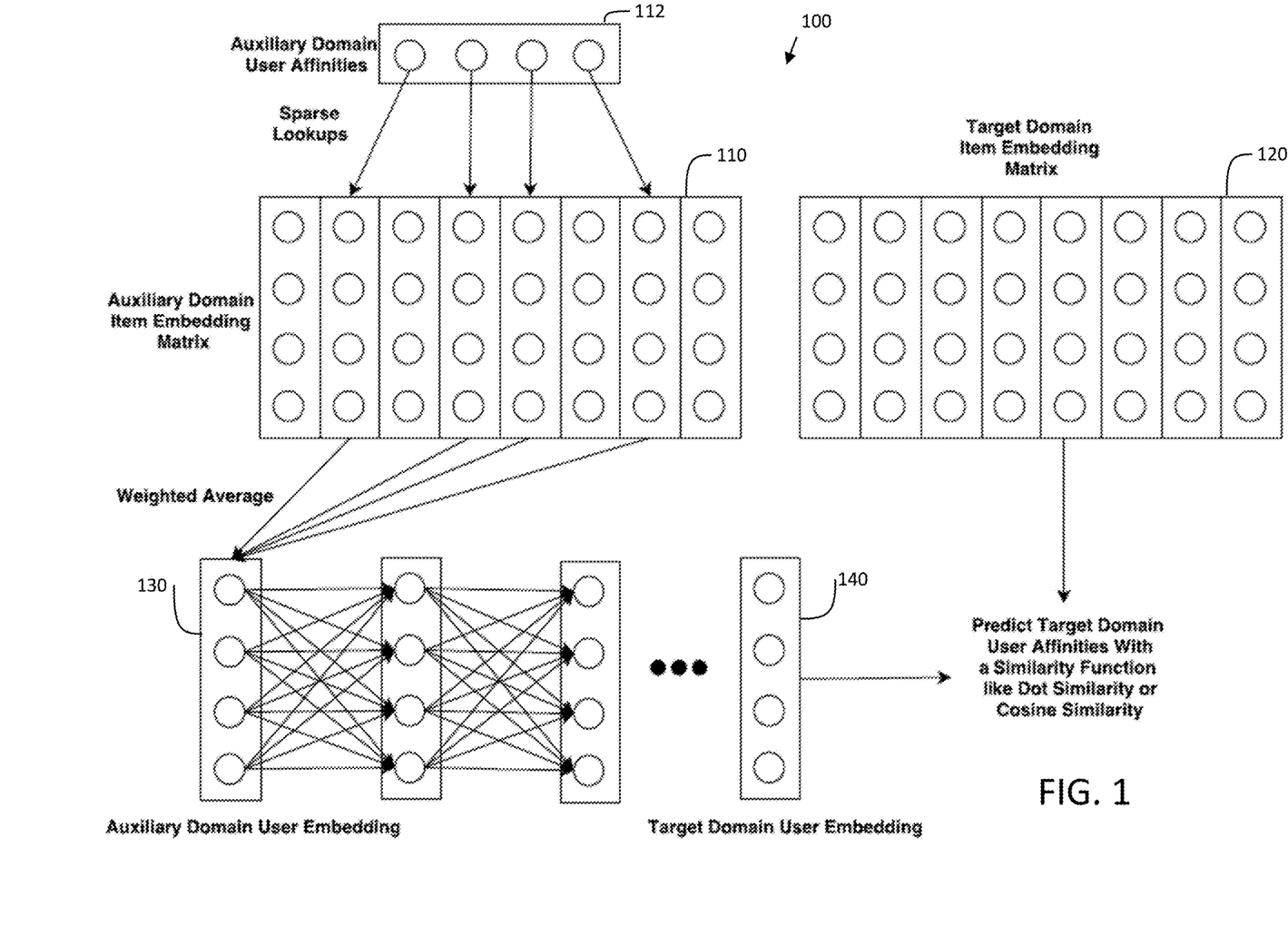
FIG. 1 illustrates an architecture for predicting target domain user affinities based on auxiliary domain user information in accordance with some embodiments.

FIG. 1 schematically illustrates a model architecture 100 for generating co-embeddings of users and target domain items in accordance with some embodiments. The model includes three components that are learned simultaneously. The embedding maps $embd^A$ and $embd_B$ assign embeddings to each item $a_i$ in the set of auxiliary domain items A and $b_j$ in the set of target domain items B. The transformation function $f(embd_{U_A}; \theta)$ transforms user u's auxiliary domain embedding $embd_{U_A}$ to a target domain embedding $embd_{U_B}$.

The model computes a user's auxiliary domain embedding 130 as a linear combination of the embeddings 110 of the items that user has interacted with, weighted by the user's affinity 112 towards those items. That is, if $embd_{A_i}$ is the embedding of item $a_i$ and $k_{ai}$ is the percent of u's interactions that were with item $a_i$, then the auxiliary domain embedding of user u is: $embd_{U_A} = k_{a1}*embd_{A_1} + k_{a2}*embd_{A_2} + \ldots$ As shown in FIG. 1, a neural network is used for the transformation function $f(embd_{U_A}; \theta)$, so a user's target domain embedding 140 can be expressed as:

$$embd_{U_B} = f(embd_{U_A}) = \phi_n(\ldots \phi_2(\phi_1(embd_{U_A})))$$

The strength of a user's affinity for some item $b_j$ in B can then be assessed as $sim(embd_{U_B}, embd_{B_j})$, where sim is a function such as:

Dot Similarity $sim(u, v) = uv$

Cosine Similarity $sim(u, v) = \dfrac{uv}{\|u\|\|v\|}$

Euclidian Similarity $sim(u, v) = 1 - \|u - v\|$

Some benefits to this framework over conventional approaches include, but are not limited to:
(1) The model can immediately generate target domain recommendations for users who have had no interactions with any items in the target domain.
(2) The model does not require any content information about the items in the auxiliary or target domains to generate predictions.
(3) The model generates user embeddings in the target domain rather than directly predicting affinity. This means that after computing a user's embedding, evaluating the distance between that user and any target domain item only involves a similarity evaluation (e.g., dot product), rather than a neural network evaluation for each pair.
(4) The target domain user embeddings can be used in a downstream machine learning task.

Unlike some prior approaches, the embedding spaces 110, 120 are learned along with the function, so the embedding spaces can exploit the joint distribution of $P(a_1, a_2, a_3 \ldots, b_1, b_2, b_3, \ldots)$ rather than just the marginal distributions $P(a_1, a_2, \ldots)$ and $P(b_1, b_2, \ldots)$.

To demonstrate this difference consider an extreme example where there are two items $a_i$, $a_j$ in A such that users' affinity for $a_i$ is highly correlated with their affinity for $a_j$. If a latent factor model like singular value decomposition (SVD) was used, affinities for these two items are likely to be collapsed into a single dimension, and a user's relative affinities for $a_i$ and $a_j$ will have a much less significant impact on $embd_{U_A}$ than the average of that user's affinities for $a_i$ and $a_j$. However, if the difference between the degrees of a user's interaction with $a_i$ and $a_j$ is the most important signal for predicting a user's interaction with items in B, it will be difficult for a model trained on the SVD latent factor representations to learn this relationship.

In contrast, if the embeddings for $a_i$ and $a_j$ consider the joint distribution $P(a_1, a_2, a_3 \ldots, b_1, b_2, b_3, \ldots)$, then the embeddings for $a_i$ and $a_j$ may be constructed in a way that their difference has a large impact on $embd_{U_A}$. For example, $embd_{A_i}$ and $embd_{A_j}$ may end up having many dimensions with opposite signs.

Because a model configured in accordance with some embodiments generates target domain co-embeddings, items can be matched to users using a simple similarity metric such as a dot product. This is beneficial for systems that compute user and item embeddings offline but must match them in real-time or near real-time (e.g., microseconds), such as mobile applications. Further, the target domain embeddings generated by the model may be used with nearest neighbor systems, which can lead to significant speedups in matching users and items.

Another useful feature of the co-embeddings is that they are powerful generic representations of user preferences in the target domain. This is especially useful if a user is new to the system that hosts the target domain items and the user's auxiliary domain interactions are the only user information that the system has access to.

Figure 2:
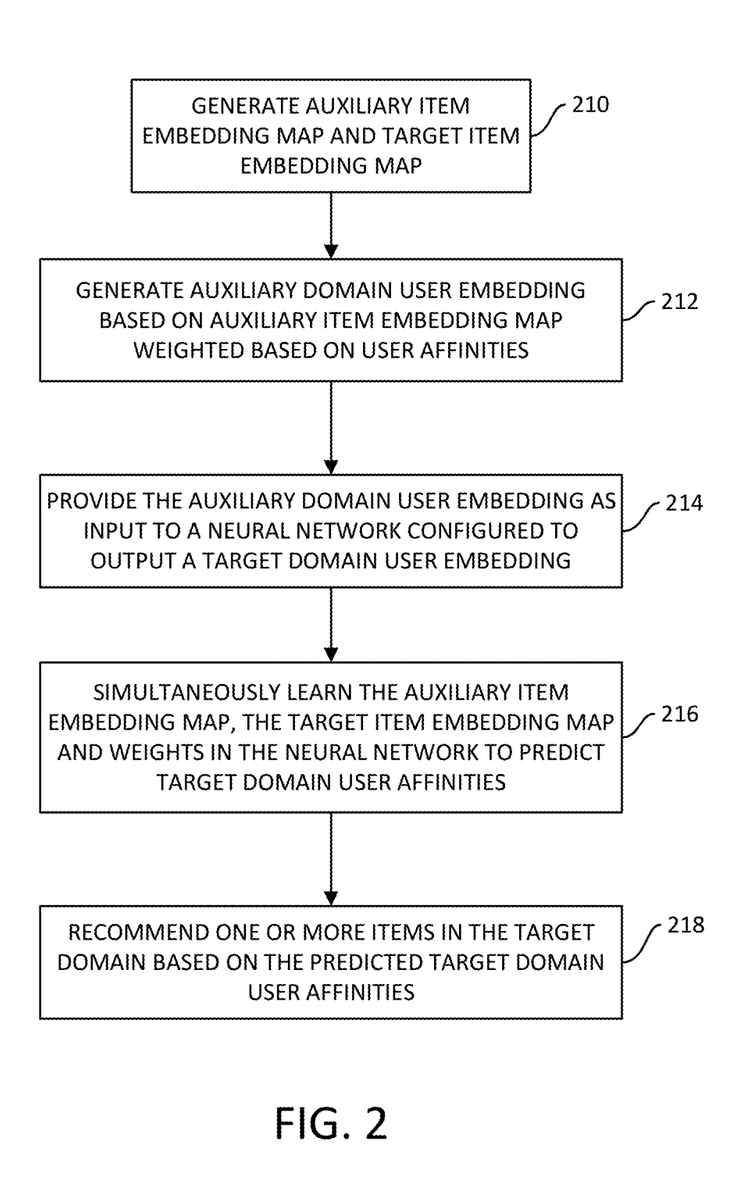
FIG. 2 is a flowchart of a process for predicting target domain user affinities using the architecture of FIG. 1.

The power of this embedding approach may be observed by stating the co-embedding property for dot product similarity in a different way: constructing a target domain co-embedding is equivalent to constructing user embeddings such that for each item $b_i$, the performance of a linear model trained on these embeddings to predict user affinity towards $b_i$ is maximized. This property suggests that these embeddings may also be good low dimensional user representations for tasks that are similar to predicting target domain item affinity, such as categorizing users, serving advertisements or predicting user demographics. Since unsupervised low dimensional representations of user interactions with auxiliary domain items may exclude or minimize the impact of information that is important for target domain related tasks, the model's user representations may perform better on these kinds of task FIG. 2 illustrates a flowchart of a process 200 for generating target domain user embeddings using the architecture of FIG. 1 in accordance with some embodiments. In act 210, an auxiliary item embedding map and a target item embedding map are generated. Referring to architecture 100 shown in FIG. 1, the auxiliary item embedding map 110 is illustrated as having a plurality of columns, each of which corresponds to an embedding vector for one item in the auxiliary domain. Each element in the auxiliary domain user affinity vector 112 has a corresponding column in the auxiliary item embedding map 110, which is used to weight the embedding vectors. Similarly, the target domain embedding map 120 is also illustrated as having a plurality of columns, each of which corresponds to an item in the target domain.

Process 200 then proceeds to act 212, where an auxiliary domain user embedding is generated based on the embedding vectors in the auxiliary item embedding map. The auxiliary domain user embedding is a linear combination of the embedding vectors in the auxiliary item embedding map weighted by the user affinities in the auxiliary domain user affinity vector. For example, matrix multiplication may be used to multiply the auxiliary domain user affinity vector by auxiliary item embedding map represented as a two-dimensional matrix. Process 200 then proceeds to act 214, where the auxiliary domain user embedding is provided as input to a neural network configured to output a target domain user embedding. Process 200 then proceeds to act 216, where the auxiliary item embedding map, the target item embedding map, and the weights in the neural network are simultaneously learned with the objective to predict target domain user affinities using a similarity function (e.g., a dot product similarity) between the target domain user embedding and items (e.g., columns) in the target domain embedding map. In some embodiments, the learning process uses a novel loss function to generate the target domain user embeddings as described in more detail below. Process 200 then proceeds to act 218, where one or more items in the target domain are recommended for the user based on the predicted target domain user affinities.

As discussed above, the objective of a model configured in accordance with some embodiments is to generate target domain user embeddings such that $sim(embd_{U_{i_B}}, embd_{B_j})$ is correlated with the affinity between user $u_i$ and item $b_j$. One technique to generate the target domain user embeddings is to model the conditional distribution over the user-item interaction counts with:

$$p(Y; \theta, \sigma^2) = \prod_{i=1}^{N} \prod_{j=1}^{M} N(Y_{ij} \mid sim(embd_{U_{i_B}}, embd_{B_j}), \sigma^2)$$

where $Y_{ij}$ is the number of interactions between user $u_i$ and item $b_j$ and $N(x|\mu, \sigma^2)$ is the probability density function of the Gaussian distribution with mean $\mu$ and variance $\sigma^2$. Then the task of maximizing the probability of this distribution is equivalent to minimizing the square error loss:

$$L = \sum^i \sum^j \left(sim(embd_{U_{i_B}}, embd_{B_j}) - Y_{ij}\right)^2$$

However, the assumptions of the above model do not generally hold, since $Var(Y_{ij})$ is not constant for all i. Users with more interactions can dominate a square error loss. In addition, as described above, an objective of the model described herein is for the user-item embedding similarities to be correlated with user-item affinity, regardless of whether they are equivalent to the exact number of interactions.

An alternative approach is to frame the problem as a personalized ranking problem and aim to make the ranking of items that the model produces for each user be as close as possible to the actual rank of the items by user interaction. One technique for doing this is to use a pairwise ranking objective that casts the ranking problem as a classification problem. At each step, a user $u_i$ and a pair of items $b_{j_1}$, $b_{j_2}$ was sampled such that $u_i$ has a greater affinity for $b_{j_2}$ than $b_{j_1}$. The loss is a function of $sim(embd_{U_{i_B}}, embd_{B_{j_1}})$ and $sim(embd_{U_{i_B}}, embd_{B_{j_2}})$. For example, in Bayesian Personalized Ranking (BPR) the loss is:

$$L = \sum^{o,b_{j1},b_{j2}} -\ln S(sim(embd_{U_{i_B}}, embd_{B_{j_2}}) - sim(embd_{U_{i_B}}, embd_{B_{j_1}}))$$

where S is the sigmoid function.

A limitation of this approach is that it tends to perform poorly on long tailed affinity distributions (since the affinity difference for most item pairs will be nearly zero), though non-uniform sampling methods have been developed to address this limitation.

One aspect of ranking objectives is that they do not attempt to capture the shape of a user's affinity function. For an extreme example, consider a user who has several distinct item affinity groups, such that within each group the user likes all items about the same and any difference in the number of interactions he/she has with them is mostly noise. Then any ranking that correctly ranks items with a significantly larger degree of affinity above items with a significantly smaller degree of affinity will be mostly true to that user's preferences. However, it is possible for the ranking loss to provide the same or an even greater penalty for improperly ordering items within affinity groups than across affinity groups. That is, it is possible for the predicted affinity to be highly correlated with the number of interactions and for the ranking loss to be large, and it is possible for the predicted affinity to be largely uncorrelated with the number of interactions but for the ranking loss to be small.

Some embodiments are directed to a novel loss function designed to avoid the problems of both of the above approaches by adopting a modified version of the mean square error loss. Consider some user $u_i$, the vector $Y_i$ of $u_i$'s interactions, and the vector $P_i$ of the model's predictions of $u_i$'s interactions. That is $P_{ij} = sim(embd_{U_{i_B}}, embd_{B_j})$. Then the portion of the mean square error loss that $u_i$ contributes is:

$$L_i \frac{1}{N_I} \sum^j (P_{ij} - Y_{ij})^2$$

The size of $L_i$ is influenced by $\|Y_i\|$, but this issue can be mitigated by pre-normalizing $Y_i$ to form the User-Normalized Mean Square Error (MSE) loss. First the vector $\hat{Y}_I$ can be computed as:

$$\hat{Y}_i = \frac{Y_i - \bar{Y}_i}{\|Y_i\|}$$

then:

$$L_{i_N} = \frac{1}{N_I} \sum^j (P_{ij} - \hat{Y}_{ij})^2$$

However, there may still be an issue with this loss: although $\|Y_i\|$ does not affect the magnitude of $L_{i_N}$, $\|P_i\|$ does, so $L_{i_N}$ is very sensitive to outliers, especially ones that make the value of $\|P_i\|$ large. Note that in a sparse matrix factorization setting each outlier user $u_o$ will not dramatically impact the optimization, since $$\frac{\partial L_{o_N}}{\partial \theta}$$

is only nonzero for $u_o$'s embedding vector and the embedding vectors of the items that $u_o$ interacted with. However, in models used in accordance with some embodiments, each outlier user has a larger impact, since $$\frac{\partial L_{o_N}}{\partial \theta}$$

is potentially nonzero for all of weights of the $f(embd_{U_A}; \theta)$ model as well as the embeddings of all the auxiliary and target domain items that $u_o$ interacted with.

This issue can be addressed by normalizing $P_i$ as well to form $\hat{P}_i$. Then the new per-user loss $\hat{L}_i$ becomes:

$$\hat{L}_i = \frac{1}{N_I} \sum^j (\hat{P}_{ij} - \hat{Y}_{ij})^2$$

$$= \frac{1}{N_I} \sum^j \hat{P}_{ij}^2 - 2\hat{P}_{ij}\hat{Y}_{ij} + \hat{Y}_{ij}^2$$

$$= 2\left(1 - \frac{1}{N_I} \sum^j \hat{P}_{ij}\hat{Y}_{ij}\right)$$

$$= 2\left(1 - \frac{\sum^j (\hat{P}_{ij} - \bar{\hat{P}}_i)(\hat{Y}_{ij} - \bar{\hat{Y}}_i)}{\sqrt{\sum^j (\hat{P}_{ij} - \bar{\hat{P}}_i)^2 \sum^j (\hat{Y}_{ij} - \bar{\hat{Y}}_i)^2}}\right)$$

$$= 2\left(1 - \frac{\sum^{j}(P_{ij} - \overline{P}_i)(Y_{ij} - \overline{Y}_i)}{\sqrt{\sum^{j}(P_{ij} - \overline{P}_i)^2 \sum^{j}(Y_{ij} - \overline{Y}_i)^2}}\right)$$

$$= 2(1 - \text{corr}(P_i, I_i))$$

Where corr is the Pearson correlation coefficient estimator (also referred to as the Pearson distance between $P_i$ and $I_i$). Removing the constant term and averaging over all users, the full loss function becomes the Per-User Correlation Loss:

$$L^c = \frac{1}{N_U}\sum^{i}\left(1 - \frac{\sum^{j}(P_{ij} - \overline{P}_i)(Y_{ij} - \overline{Y}_i)}{\sqrt{\sum^{j}(P_{ij} - \overline{P}_i)^2 \sum^{j}(Y_{ij} - \overline{Y}_i)^2}}\right)$$

$$= \frac{1}{N_U}\sum^{i} L_i^c$$

By using this as the loss function the correlations between the model's predictions and each user's actual numbers of interactions can be maximized. However, the derivative of $L_i^c$ with respect to $P_{ij}$ is:

$$\frac{\partial L_i^c}{\partial P_{ij}} = -\left(\frac{(Y_{ij} - \overline{Y}_i) - \frac{\sum^{j}(P_{ij} - \overline{P}_i)(Y_{ij} - \overline{Y}_i)}{\sum^{j}(P_{ij} - \overline{P}_i)^2}(P_{ij} - \overline{P}_i)}{\sqrt{\sum^{j}(P_{ij} - \overline{P}_i)^2 \sum^{j}(Y_{ij} - \overline{Y}_i)^2}}\right)$$

That is, in order to compute the gradient for even a single user-item pair a sum over all j must be computed. To address this the following modification of mini-batch gradient descent may be applied:

(1) Uniformly sample a small set of users $S_U$ with size $N_{S_U}$ and a small set of items $S_I$ with size $N_{S_I}$.

(2) Compute $P_{ij}$ for $i \in S_U$ and $j \in S_I$ (3) Compute the following loss function, where $\overline{P_{iS_I}}$ and $\overline{Y_{iS_I}}$ are the means of $P_i$ and $Y_i$ over the elements in $S_I$:

$$L^{cs} = \frac{1}{N_{S_U}}\sum^{i \in S_U}\left(1 - \frac{\sum^{j \in S_I}(P_{ij} - \overline{P_{iS_I}})(Y_{ij} - \overline{Y_{iS_I}})}{\sqrt{\sum^{j \in S_I}(P_{ij} - \overline{P_{iS_I}})^2 \sum^{j \in S_I}(Y_{ij} - \overline{Y_{iS_I}})^2}}\right)$$

$$= \frac{1}{N_{U_S}}\sum^{i \in S_U}(1 - \text{corr}_{S_I}(P_i, I_i))$$

(4) Use the following gradient $\nabla_j L^{cs}$ to perform a gradient update step:

$$\frac{1}{N_{U_S}}\sum^{i \in S_U}-\left(\frac{(Y_{ij} - \overline{Y_{iS}}) - \frac{\sum^{j \in S_I}(P_{ij} - \overline{P_{iS_I}})(Y_{ij} - \overline{Y_{iS_I}})}{\sum^{j \in S_I}(P_{ij} - \overline{P_{iS_I}})^2}(P_{ij} - \overline{P_{iS}})}{\sqrt{\sum^{j \in S_I}(P_{ij} - \overline{P_{iS_I}})^2 \sum^{j \in S_I}(Y_{ij} - \overline{Y_{iS_I}})^2}}\right)$$

It can be observed that computing this gradient only requires a sum over $j \in S_I$ and $i \in S_U$.

Figure 3A:
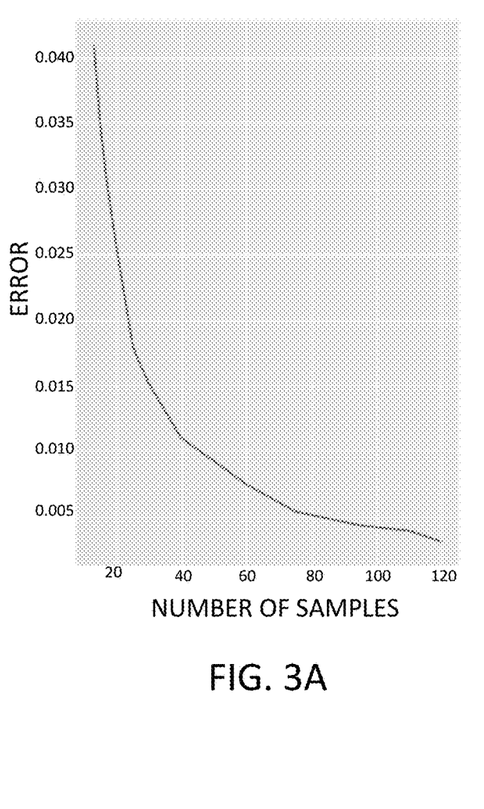
FIGS. 3A and 3B are plots showing that the correlation prediction error and correlation gradient prediction error, respectively, decrease exponentially as the number of item samples increases in accordance with some embodiments.
Figure 3B:
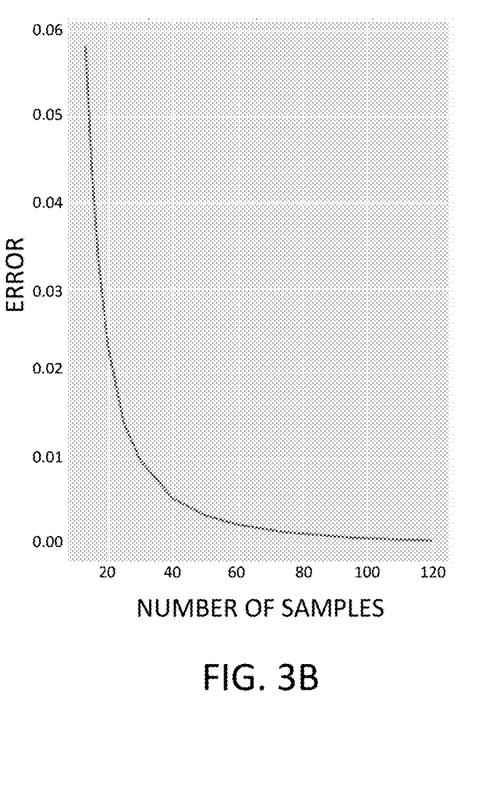
Figure 4A:
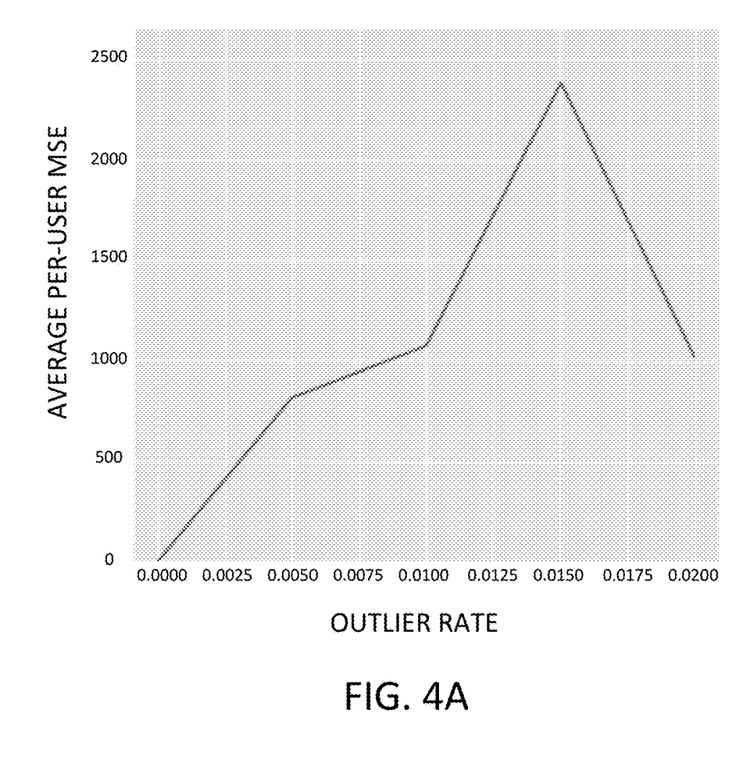
FIGS. 4A-D are plots comparing the performance of different loss functions for learning a linear function in the presence of outlier users.
Figure 4B:
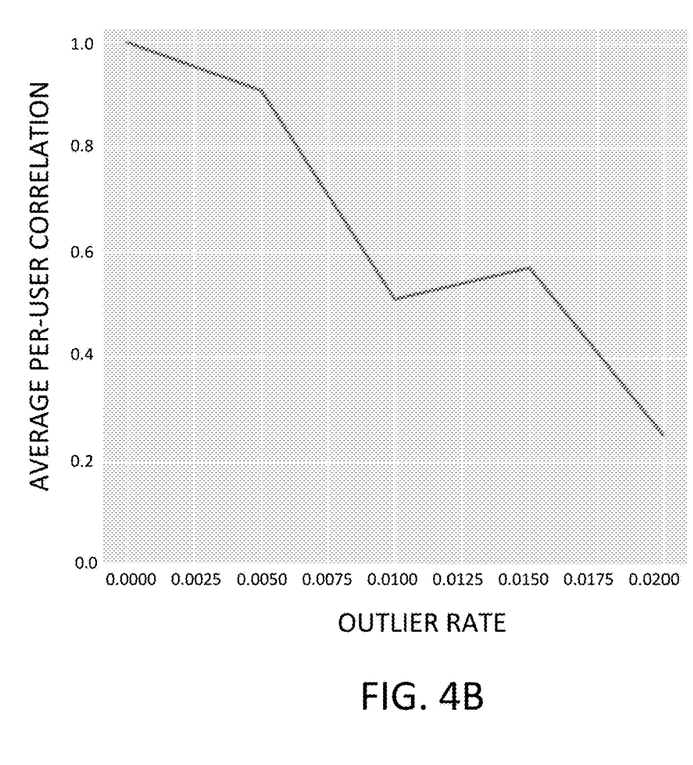
Figure 4C:
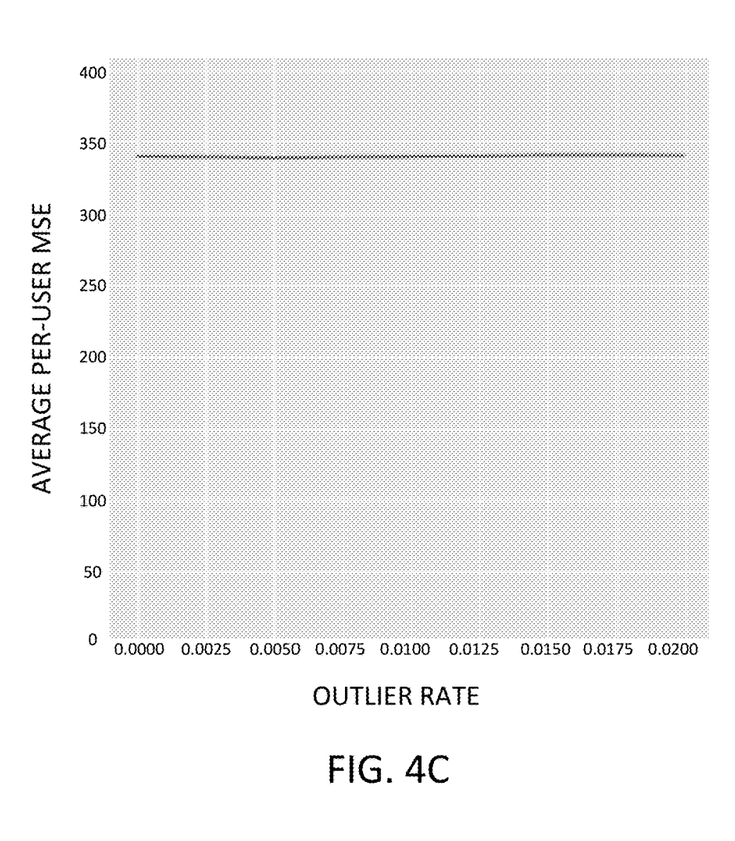
Figure 4D:
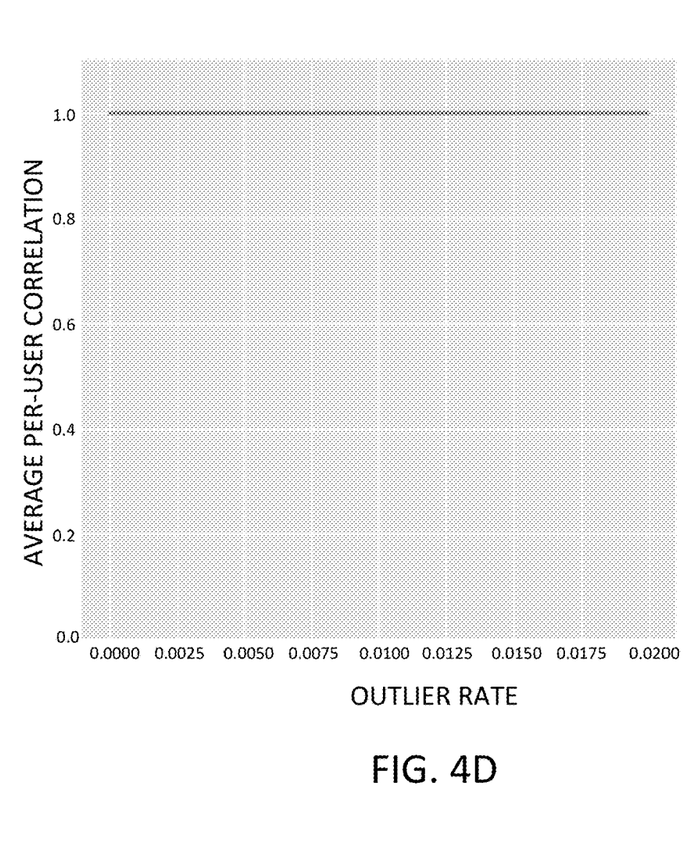

As $N_{S_I}$ is increased $L^{cs}$ becomes an exponentially better estimate of $L^c$ and $\nabla L^{cs}$ becomes a better estimate for $\nabla L^c$ as shown in FIGS. 3A and 3B. Further, it can be shown that $\nabla_j L^{cs}$ is an approximately unbiased estimate for $\nabla_j L^c$:

LEMMA 1. $\nabla_j L^{cs}$ is an approximately unbiased estimate of $\nabla_j L^c$, such that $\mathbb{E}_{S_U}\mathbb{E}_{S_I}[\nabla_j L^{cs}] = \nabla_j L^c + O(1/N_{I_S})$ First, write $\mathbb{E}_{S_U}\mathbb{E}_{S_I}[\nabla_j L^{cs}]$ as $$\mathbb{E}_{S_U}\mathbb{E}_{S_I}\left[\nabla_j \frac{1}{N_{U_S}}\sum^{i \in S_U}(1 - \text{corr}_{S_I}(P_i, I_i))\right]$$

Since $\mathbb{E}_{S_U}$ and $\mathbb{E}_{S_I}$ can be expressed as sums, this is equivalent to:

$$\nabla_j \mathbb{E}_{S_U}\left[\frac{1}{N_{U_S}}\sum^{i \in S_U}(1 - \mathbb{E}_{S_I}[\text{corr}_{S_I}(P_i, I_i)])\right]$$

Note that sample correlation $\text{corr}_{S_I}(P_i, I_i)$ is not an unbiased estimator of population correlation $\text{corr}(P_i, I_i)$, but $$\mathbb{E}_{S_I}[\text{corr}_{S_I}(P_i, I_i)] = \text{corr}(P_i, I_i) - \frac{\text{corr}(P_i, I_i) - \text{corr}(P_i, I_i)^3}{2N_{I_S}} + O(1/N_{I_S}^2)$$

$$= \text{corr}(P_i, I_i) - O(1/N_{I_S})$$

which implies:

$$\mathbb{E}_{S_U}\mathbb{E}_{S_I}\nabla_j L^{cs} = \nabla_j \mathbb{E}_{S_U}\left[\frac{1}{N_{U_S}}\sum^{i \in S_U}(1 - \text{corr}(P_i, I_i) + O(1/N_{I_S}))\right]$$

$$= \nabla_j \mathbb{E}_{S_U}\left[\frac{1}{N_{U_S}}\sum^{i \in S_U} L_i^c\right] + O(1/N_{I_S})$$

-continued $$= \frac{1}{N_{U_S}} \sum^{i \in S_U} \mathbb{E}_{S_U}[\nabla_j L_i^c] + O(1/N_{I_S})$$

Since $S_U$ is formed by uniformly sampling users $\mathbb{E}_{S_U}[\nabla_j L_i^c] = \nabla_j L^c$ So $$\mathbb{E}_{S_U} \mathbb{E}_{S_I} \nabla_j L^{cs} = \frac{1}{N_{U_S}} \sum^{i \in S_U} \nabla_j L^c + O(1/N_{I_S})$$

$$= \nabla_j L^c + O(1/N_{I_S}).$$

To demonstrate the advantage that the Per-User Correlation Loss function used in accordance with some embodiments has over a conventional User-Normalized MSE loss function, an experiment was performed with simulated data.

In this experiment cross domain user-item interaction data were generated by modeling users' auxiliary domain item interactions with a Multivariate Gaussian and assigning each user's target domain item interactions to be a linear function of their auxiliary domain item interactions (note that this produces dense user-item interaction data). Stochastic gradient descent was then performed with the Per-User Correlation Loss function and User-Normalized MSE loss function to learn the parameters of the linear function. In order to evaluate each strategy's sensitivity to outliers with large values of $\|P_i\|$, fake "outlier users" with large numbers of auxiliary domain item interactions (about 1000× more than average) and random target domain item interactions were added.

The experimental setup is as follows: for each "Outlier User Rate" a fixed number of gradient descent steps (1 million) was taken towards minimizing the loss. At each step, an additional "outlier user" with probability equal to the "Outlier User Rate" (these users don't count towards the fixed number of steps) was added. Afterwards the performance of the trained model was evaluated with both the User-Normalized MSE and the Per-User Correlation metrics.

FIGS. 4A-4D compare the performance of User-Normalized MSE and Per-User Correlation Loss for learning a linear function in the presence of outliers. As shown, as the frequency with which "outlier users" are added from 0 to 0.02 the performance of the User-Normalized MSE model decreases and the performance of the Per-User Correlation Loss model does not.

Experiments

In the social media context, users with large and active sets of followers are sometimes referred to as "producers." Producers generate new content on a regular basis, and for each user the objective is to recommend producers with whom they are likely to heavily interact. When a new user registers for a social media service, it is important to recommend producers to them as quickly as possible so they can start interacting with content that interests them. However, at this stage the user has not interacted with any producers yet, so conventional recommendation techniques cannot be used effectively. Fortunately, before most users sign up for social media services (e.g., Twitter) they interact with the social media service in an indirect way by visiting web domains that have embedded social media content (within the Twitter ecosystem, these are referred to as Twitter for Websites (TFW) domains).

Figure 5A:
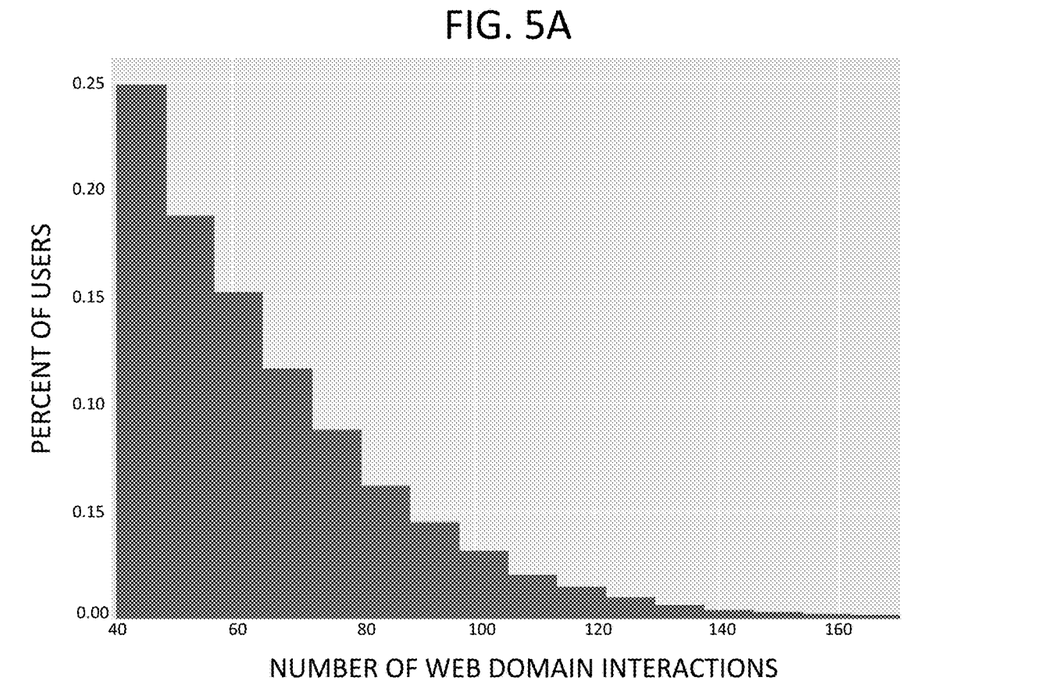
FIGS. 5A and 5B are plots showing that interaction distributions between users and web domains and producer users, respectively, are skewed.
Figure 5B:
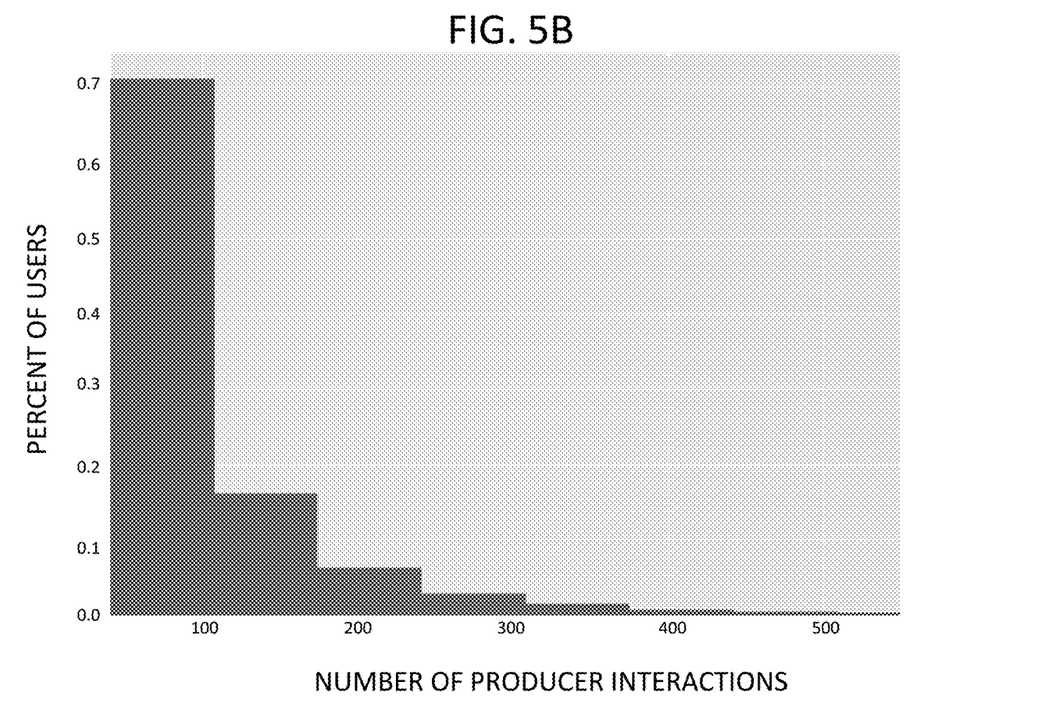

FIGS. 5A and 5B show that the interaction distributions between users and web domains (FIG. 5A) and producers (5B) are heavily skewed.

In a first experiment, a model configured in accordance with some embodiments was evaluated on the task of predicting user-producer affinity (also referred to above as "target domain item affinity") from observed user-TFW domain affinity (also referred to above as "auxiliary domain item affinity"). In this task the affinity between an active user and a producer was considered to be the number of times that the user interacts with one of the producer's posts. Similarly, the affinity between a user and a TFW domain was considered to be the number of times that the user visits the TFW domain.

In a second experiment it was demonstrated that the trained embeddings can be used as powerful feature representations for the auxiliary task of predicting user topic interests.

In order to train the model some of the most popular TFW domains and producers were selected and a dataset of the interactions between a set of users and these domains and producers was determined. In order to reduce noise and maximize the consistency between interactions and affinity, users were required to have at least 40 interactions with both TFW domains and producers. In total, the dataset contained 359,066 users, 95,352 TFW domains and 829,131 producers.

The following models were evaluated on the task. To maintain consistency, 300 element embeddings were used for each model:

Matrix Factorization. A user-item affinity matrix was constructed where each row represents a training set user and each column represents an item from the auxiliary or target domains. This matrix was then factorized with either singular value decomposition or alternating least squares. Then, for each user in the testing set, a folding-in technique was applied to the auxiliary domain user-item affinity vectors to generate predictions of the target domain user-item affinity vectors.

Canonical Correlation Analysis. Low dimensional representations of users' auxiliary and target domain user-item affinity matrices were generated and mapping between them was computed with canonical correlation analysis. The target domain user-item affinity matrix was reconstructed from the low dimensional prediction.

Embedding to Embedding. Low dimensional representations of the user's auxiliary and target domain user-item affinity matrices were generated and a neural network was used to learn a mapping from the auxiliary domain user embeddings to the target domain user embeddings. The similarities between the target domain user and item embeddings was used to approximate the target domain user-item affinities.

Nine models designed in accordance with some embodiments (referred to as ImplicitCE herein) were trained over three embedding similarity functions sim(u, v) and three loss functions L. The embedding similarity functions used were Dot Similarity uv, Cosine Similarity $$\frac{uv}{\|u\|\|v\|}$$

and Euclidian similarity $1-\|u-v\|$. The loss functions used were the Per-User Correlation loss function as described herein (with a variety of values for the $N_{S_U}$ and $N_{S_I}$ hyperparameters), the User-Normalized MSE loss function:

$$L = \frac{1}{N_U N_I} \sum{}^i \sum{}^j \left( sim(embd_{U_{i_B}}, embd_{B_j}) - \frac{Y_{ij}}{\|Y_i\|} \right)^2,$$

and the Bayesian Personalized Ranking loss function. In order to verify the impact of nonlinearity in mapping from auxiliary to target domain affinity, the nine models were trained with both neural network and linear models for $f(embd_{U_A}; \theta)$.

The performance of all models was evaluated on the following metrics:

(1) NDCG and ERR. The Normalized Discounted Cumulative Gain and Expected Reciprocal Rank metrics evaluate the consistency between the ranking induced by the model's user-item affinity prediction and the ranking induced by the true user-item affinity.

(2) Recall at K. The "Recall at K" metric measures the frequency with which a model ranks at least one item that the user interacted with at least once in the top K items.

(3) Pearson Correlation. The Pearson Correlation metric evaluates the strength of the linear relationship between the model's predictions of user-item affinity and the true user-item affinity.

For each model a random search was performed over the model hyperparameters to find the configuration that performs best on a validation set of 10,000 users. That model was then evaluated on a holdout set of 10,000 users. In order to compare models, the averages and 95% confidence intervals of each metric were computed over all users in the holdout set.

Table 1 shows that the model designed in accordance with some embodiments (referred to in Table 1 as ImplicitCE) trained with the Per-User Correlation loss function (referred to in Table 1 as SampleCorr Loss) significantly outperformed the baseline models on all metrics, regardless of the choice of embedding similarity function. Further, it was observed that the SampleCorr loss function significantly outperformed the BPR and MSE loss functions over all embedding similarity functions.

TABLE 1

Comparison on model performance by 95% confidence intervals over the holdout users. The hyperparameters for all models were chosen by random search over a validation set.

| | | Correlation | NDCG | ERR | Recall @ 10 |
|---|---|---|---|---|---|
| ImplicitCE$_{Cosine\ Similarity}$ | SampleCorr Loss | 0.308 ± 0.0018 | 0.533 ± 0.0024 | 0.306 ± 0.0022 | 0.891 ± 0.0046 |
| | MSE Loss | 0.246 ± 0.0022 | 0.434 ± 0.0030 | 0.246 ± 0.0024 | 0.746 ± 0.0062 |
| | BPR Loss | 0.096 ± 0.0004 | 0.335 ± 0.0020 | 0.221 ± 0.0018 | 0.668 ± 0.0051 |
| ImplicitCE$_{Dot\ Similarity}$ | SampleCorr Loss | 0.231 ± 0.0020 | 0.396 ± 0.0016 | 0.234 ± 0.0024 | 0.722 ± 0.0064 |
| | MSE Loss | 0.176 ± 0.0016 | 0.301 ± 0.0022 | 0.164 ± 0.0020 | 0.453 ± 0.0056 |
| | BPR Loss | 0.149 ± 0.0012 | 0.325 ± 0.0020 | 0.213 ± 0.0020 | 0.676 ± 0.0052 |
| ImplicitCE$_{Euclidian\ Similarity}$ | SampleCorr Loss | 0.228 ± 0.0018 | 0.434 ± 0.0026 | 0.256 ± 0.0024 | 0.769 ± 0.0060 |
| | MSE Loss | 0.021 ± 0.0005 | 0.173 ± 0.0022 | 0.096 ± 0.0014 | 0.322 ± 0.0050 |
| | BPR Loss | 0.159 ± 0.0016 | 0.314 ± 0.0020 | 0.229 ± 0.0018 | 0.707 ± 0.0050 |
| Baseline Models | SVD | 0.128 ± 0.0026 | 0.310 ± 0.0040 | 0.107 ± 0.0038 | 0.433 ± 0.0212 |
| | Implicit ALS | 0.079 ± 0.0022 | 0.249 ± 0.0030 | 0.151 ± 0.0058 | 0.583 ± 0.0220 |
| | CCA | 0.039 ± 0.0018 | 0.256 ± 0.0052 | 0.056 ± 0.0032 | 0.138 ± 0.0148 |
| | Embedding to Embedding | 0.189 ± 0.0028 | 0.331 ± 0.0166 | 0.165 ± 0.0034 | 0.701 ± 0.0044 |

The top performing ImplicitCE architecture was a two layer neural network with 1024 units, batch normalization and a relu activation function on both layers. The model was trained with a Gradient Descent optimizer with a learning rate of 0.05, a dropout rate of 0.3, and an L2 weight regularization penalty of 0.001. For the SampleCorr objective, $N_{S_I}=1000$ and $N_{S_U}=64$ were used. The auxiliary and target domain item embedding dimensions were fixed to be 300 elements.

Figure 6A:
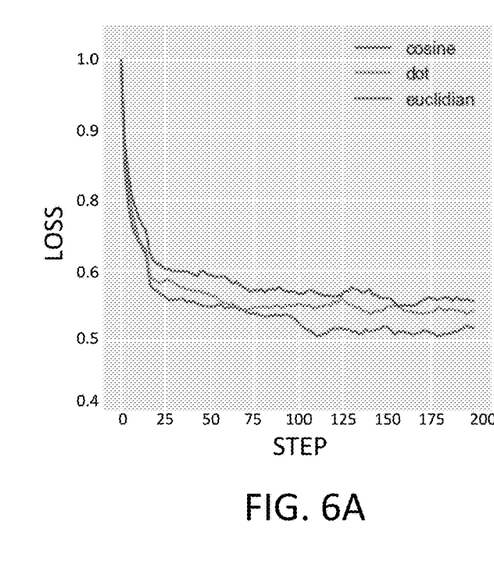
FIGS. 6A-C show plots of example learning curves for training the model architecture of FIG. 1 using different loss and embedding similarity functions.
Figure 6B:
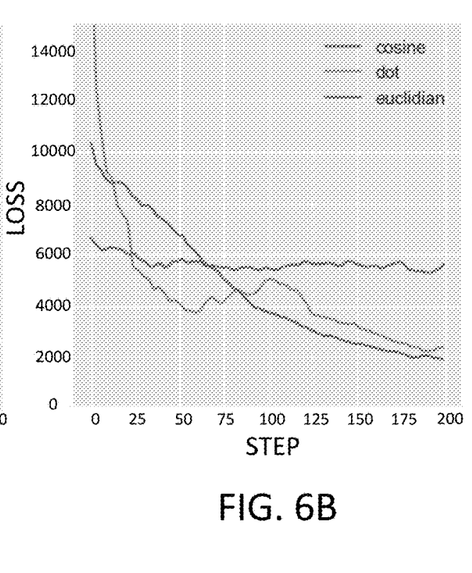
Figure 6C:
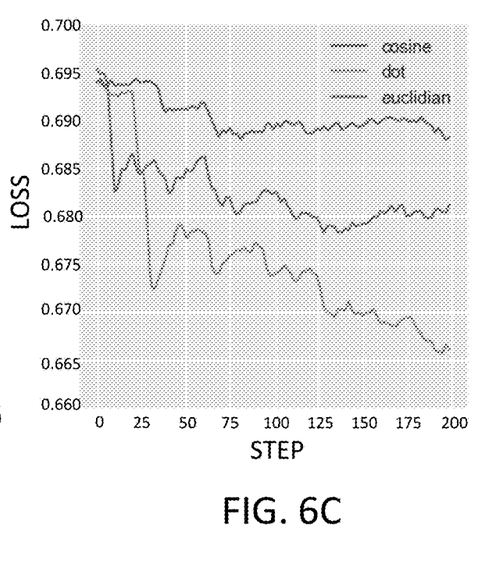

FIGS. 6A-C illustrate example learning curves for the ImplicitCE model by loss and similarity function. FIG. 6A shows the learning curves for the ImplicitCE model trained using the SampleCore loss function (i.e., the novel model and novel loss function described herein). FIG. 6B shows the learning curves for the ImplicitCE model trained using the Mean Square Error loss function. FIG. 6C shows the learning curves for the ImplicitCE model trained using the BPR loss function. As shown, for each of the similarity measures, the ImplicitCE model trained using the SampleCore loss function (FIG. 6A) outperformed the ImplicitCE model trained using the other loss functions.

As shown in Table 2, it was observed that neither the number of layers nor the choice of optimization method had large impacts on model performance, and that while replacing the neural network with a linear model does reduce performance, the effect is not dramatic.

TABLE 2

Comparison of ImplicitCE performance over model hyperparameters by 95% confidence intervals over the holdout users. The other hyperparameters (including embedding similarity function) were chosen by random search over a validation set.

|  | Correlation | NDCG | ERR | Recall @ 10 |
|---|---|---|---|---|
| Linear $f$ (embd$_{U_A}$; θ) | 0.259 ± 0.0014 | 0.498 ± 0.0018 | 0.302 ± 0.0016 | 0.881 ± 0.0034 |
| One Layer $f$ (embd$_{U_A}$; θ) | 0.278 ± 0.0026 | 0.506 ± 0.0040 | 0.306 ± 0.0022 | 0.887 ± 0.0212 |
| Two Layer $f$ (embd$_{U_A}$; θ) | 0.308 ± 0.0018 | 0.533 ± 0.0024 | 0.306 ± 0.0038 | 0.891 ± 0.0046 |
| Three Layer $f$ (embd$_{U_A}$; θ) | 0.318 ± 0.0014 | 0.529 ± 0.0018 | 0.307 ± 0.0016 | 0.890 ± 0.0032 |
| Four Layer $f$ (embd$_{U_A}$; θ) | 0.307 ± 0.0014 | 0.509 ± 0.0020 | 0.318 ± 0.0016 | 0.872 ± 0.0038 |
| Vanilla Gradient Descent | 0.308 ± 0.0018 | 0.533 ± 0.0024 | 0.306 ± 0.0038 | 0.891 ± 0.0046 |
| Gradient Descent with Momentum | 0.320 ± 0.0010 | 0.522 ± 0.0012 | 0.299 ± 0.0018 | 0.890 ± 0.0028 |
| Adam | 0.318 ± 0.0016 | 0.508 ± 0.0022 | 0.304 ± 0.0018 | 0.860 ± 0.0038 |

Some users choose to directly indicate which topics interest them. Based on data from those users, it is possible to evaluate the ability of user embeddings generated in accordance with some embodiments to serve as efficient representations of users' preferences by training a logistic regression model on them to predict these interest topic selections.

In this task a variety of methods were used to transform users' TFW domain affinities into user embeddings and train logistic regression models on these embeddings to predict "indicated"/"did not indicate" for each of the "Sports", "Music", "Entertainment", "Government & Politics", "News", and "Arts & Culture" categories. A smaller dataset of 3000 users was used and 20-fold cross validation was performed over these users. The model's performance was quantified with the mean and 95% confidence interval of the cross validation ROC-AUC for each topic.

Since the topic prediction task requires the model to predict users' actions within the social media platform, it is possible that a method that generates embeddings that are finely tuned to reflect users' affinities within the social media platform is particularly useful for this task, especially since patterns of web domain affinity are significantly different from patterns of social media account affinity. For example, a particular web domain likely hosts content that appeals to a wider variety of viewpoints and interests than a particular social media account.

Therefore, canonical low-dimensional representations of web domain content that are optimized for a web domain reconstruction objective may be suboptimal for a social media interest prediction task.

As a baseline user embeddings were generated by either factorizing the user-web domain interaction matrix with the SVD and ALS algorithms or compressing the user-web domain interaction matrix with an Autoencoder. All three models were trained on the full web domain interaction dataset to generate embeddings of dimension 300. These models attempt to generate representations that contain the maximum amount of information about a user's preferences for web domains, but do not attempt to represent user preferences for items within Twitter.

TABLE 3

Validation ROC-AUC for each of the topic prediction tasks by 95% confidence intervals over the cross-validation folds.

|  | Sports | Music | Entertainment | Government & Politics | News | Arts & Culture |
|---|---|---|---|---|---|---|
| SVD | 0.730 ± 0.016 | 0.568 ± 0.020 | 0.624 ± 0.018 | 0.618 ± 0.012 | 0.623 ± 0.020 | 0.641 ± 0.018 |
| ALS | 0.739 ± 0.022 | 0.589 ± 0.008 | 0.626 ± 0 008 | 0.650 ± 0.008 | 0.622 ± 0.014 | 0.651 ± 0.012 |
| Autoencoder | 0.602 ± 0.026 | 0.575 ± 0.024 | 0.675 ± 0.032 | 0.598 ± 0.050 | 0.639 ± 0.052 | 0.678 ± 0.022 |
| ImplicitCE | 0.781 ± 0.012 | 0.696 ± 0.012 | 0.671 ± 0.012 | 0.735 ± 0.012 | 0.726 ± 0.012 | 0.715 ± 0.014 |

As shown in Table 3, it was observed that for five out of the six topics, models trained on the embeddings generated in accordance with some embodiments outperformed all baseline models.

Figure 7:
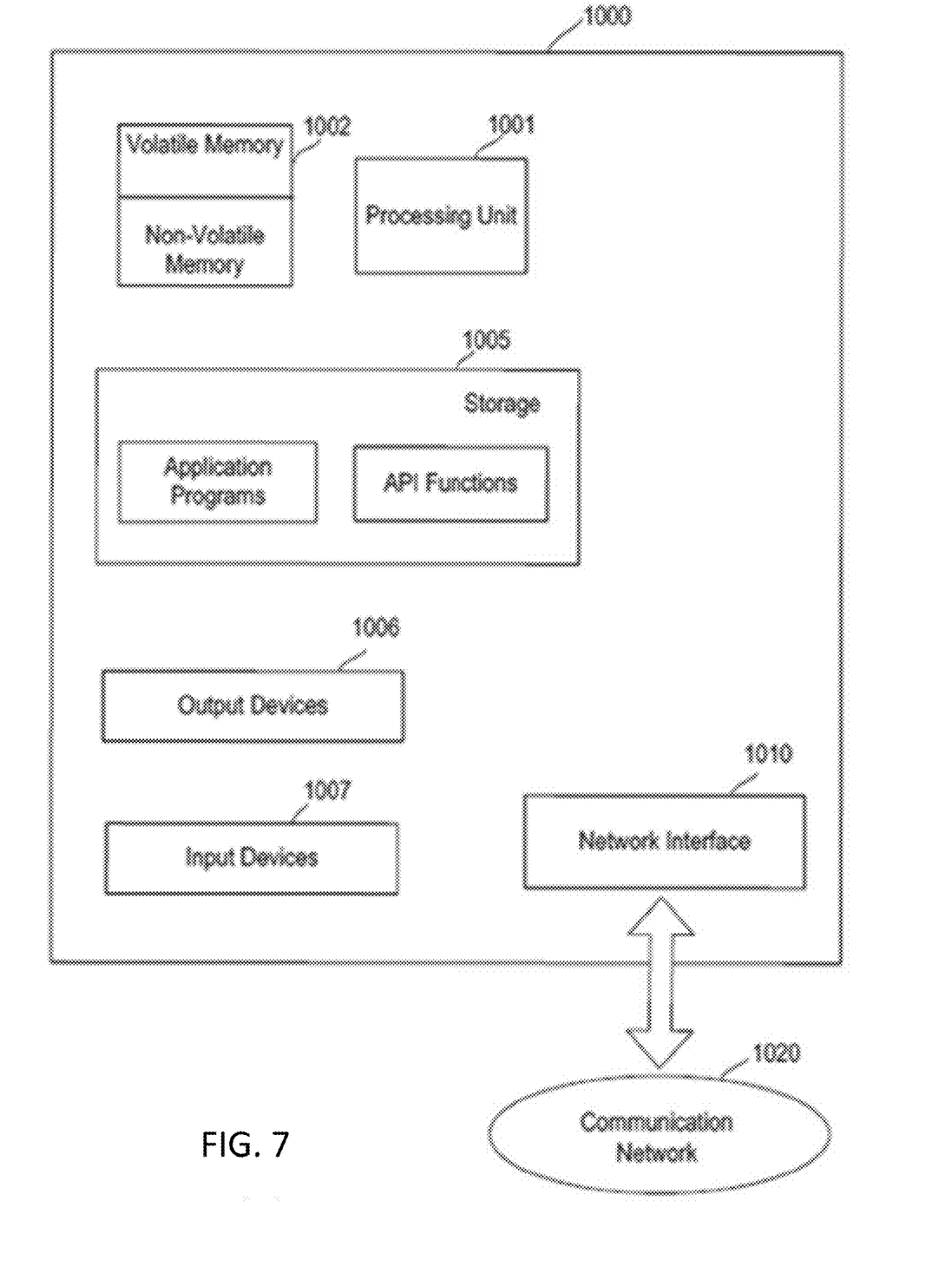
FIG. 7 illustrates a block diagram of a computer system on which some embodiments may be employed.

FIG. 7 shows, schematically, an illustrative computer 1000 on which any aspect of the present disclosure may be implemented. In the embodiment shown in FIG. 7, the computer 1000 includes a processing unit 1001 having one or more computer hardware processors and one or more articles of manufacture that comprise non-transitory computer-readable storage media (e.g., system memory 1002) that may include, for example, volatile and/or non-volatile memory. The computer-readable storage media 1002 may store one or more instructions to program the processing unit 1001 to perform any of the functions described herein. The computer 1000 may also include other types of non-transitory computer-readable media, such as storage 1005 (e.g., one or more disk drives) in addition to the system memory 1002. The storage 1005 may also store one or more application programs and/or external components used by application programs (e.g., software libraries), which may be loaded into the memory 1002. To perform any of the functionality described herein, processing unit 1001 may execute one or more processor-executable instructions stored in the one or more non-transitory computer-readable storage media (e.g., memory 1002, storage 1005), which may serve as non-transitory computer-readable storage media storing processor-executable instructions for execution by the processing unit 1001.

The computer 1000 may have one or more input devices and/or output devices, such as devices 1006 and 1007 illustrated in FIG. 7. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, the input devices 1007 may include a microphone for capturing audio signals, and the output devices 1006 may include a display screen for visually rendering, and/or a speaker for audibly rendering, recognized text.

As shown in FIG. 7, the computer 1000 may also comprise one or more network interfaces (e.g., the network interface 1010) to enable communication via various networks (e.g., the network 1020). Examples of networks include a local area network or a wide area network, such as an enterprise network or the Internet. Such networks may be based on any suitable technology and may operate according to any suitable protocol and may include wireless networks, wired networks or fiber optic networks.

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer-readable medium or media can be transportable, such that the program or programs stored thereon can be loaded onto one or more different computers or other processors to implement various aspects of the present disclosure as discussed above.

The terms "program" or "software" are used herein to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A computer-implemented system for determining a set of items in a target domain to recommend to a user without the user having previously interacted with items in the target domain, the system comprising:
    at least one computer processor; and
    a non-transitory computer readable medium encoded with a plurality of instructions that, when executed by the at least one computer processor perform a method, the method comprising:
        generating an auxiliary domain user embedding based on user affinities for each of a plurality of items in an auxiliary domain and an auxiliary domain embedding map that includes an embedding for each of the plurality of items in the auxiliary domain;
        providing the auxiliary domain user embedding as input to a neural network configured to output a target domain user embedding;
        predicting target domain user affinities for one or more items in the target domain based, at least in part, on a similarity measure between the target domain user embedding and an embedding for at least one item in the target domain included in a target domain embedding map; and
        determining a set of items in the target domain to recommend to the user based, at least in part, on the predicted target domain user affinities,
        wherein the auxiliary domain embedding map, the target domain embedding map, and weights in the neural network were simultaneously trained using a per-user correlation loss function.

2. The computer-implemented system of claim 1, wherein generating an auxiliary domain user embedding comprises generating the auxiliary domain user embedding as a linear combination of auxiliary domain embeddings in the auxiliary domain embedding map weighted by the user affinities for each of the plurality of items in the auxiliary domain.

3. The computer-implemented system of claim 2, wherein the method further comprises:
    generating an auxiliary domain user affinity vector, each element of which specifies a user affinity for an item in the auxiliary domain, and
    wherein generating the auxiliary domain user embedding comprises performing a matrix multiplication between the auxiliary domain affinity vector and the auxiliary domain embedding map.

4. The computer-implemented system of claim 1, wherein the similarity measure is a dot product similarity measure or a cosine similarity measure.

5. The computer-implemented system of claim 1, wherein the method further comprises:
    generating a co-embedding based on the auxiliary domain user embedding and the target domain user embedding; and
    using the co-embedding in an approximate nearest neighbors task to generate at least one recommendation for the user.

6. The computer-implemented system of claim 1, wherein the auxiliary domain comprises website interactions with embedded social media content.

7. A computer-implemented method for determining a set of items in a target domain to recommend to a user without the user having previously interacted with items in the target domain, the method comprising:
    generating an auxiliary domain user embedding based on user affinities for each of a plurality of items in an auxiliary domain and an auxiliary domain embedding map that includes an embedding for each of the plurality of items in the auxiliary domain;
    providing the auxiliary domain user embedding as input to a neural network configured to output a target domain user embedding;
    predicting target domain user affinities for one or more items in the target domain based, at least in part, on a similarity measure between the target domain user embedding and an embedding for at least one item in the target domain included in a target domain embedding map; and
    determining a set of items in the target domain to recommend to the user based, at least in part, on the predicted target domain user affinities,
    wherein the auxiliary domain embedding map, the target domain embedding map, and weights in the neural network were simultaneously trained using a per-user correlation loss function.

8. The computer-implemented method of claim 7, wherein generating an auxiliary domain user embedding comprises generating the auxiliary domain user embedding as a linear combination of auxiliary domain embeddings in the auxiliary domain embedding map weighted by the user affinities for each of the plurality of items in the auxiliary domain.

9. The computer-implemented method of claim 8, further comprising:
    generating an auxiliary domain user affinity vector, each element of which specifies a user affinity for an item in the auxiliary domain, and
    wherein generating the auxiliary domain user embedding comprises performing a matrix multiplication between the auxiliary domain affinity vector and the auxiliary domain embedding map.

10. The computer-implemented method of claim 7, wherein the similarity measure is a dot product similarity measure or a cosine similarity measure.

11. The computer-implemented method of claim 7, further comprising:
    generating a co-embedding based on the auxiliary domain user embedding and the target domain user embedding; and using the co-embedding in an approximate nearest neighbors task to generate at least one recommendation for the user.

12. A non-transitory computer-readable medium encoded with a plurality of instructions that, when executed by at least one computer processor, perform a method, the method comprising:
   generating an auxiliary domain user embedding based on user affinities for each of a plurality of items in an auxiliary domain and an auxiliary domain embedding map that includes an embedding for each of the plurality of items in the auxiliary domain;
   providing the auxiliary domain user embedding as input to a neural network configured to output a target domain user embedding;
   predicting target domain user affinities for one or more items in the target domain based, at least in part, on a similarity measure between the target domain user embedding and an embedding for at least one item in the target domain included in a target domain embedding map; and
   determining a set of items in the target domain to recommend to the user based, at least in part, on the predicted target domain user affinities,
   wherein the auxiliary domain embedding map, the target domain embedding map, and weights in the neural network were simultaneously trained using a per-user correlation loss function.

13. The non-transitory computer-readable medium of claim 12, wherein generating an auxiliary domain user embedding comprises generating the auxiliary domain user embedding as a linear combination of auxiliary domain embeddings in the auxiliary domain embedding map weighted by the user affinities for each of the plurality of items in the auxiliary domain.

14. The non-transitory computer-readable medium of claim 13, wherein the method further comprises:
   generating an auxiliary domain user affinity vector, each element of which specifies a user affinity for an item in the auxiliary domain, and
   wherein generating the auxiliary domain user embedding comprises performing a matrix multiplication between the auxiliary domain affinity vector and the auxiliary domain embedding map.

15. The non-transitory computer-readable medium of claim 12, wherein the similarity measure is a dot product similarity measure or a cosine similarity measure.

* * * * *